(12) United States Patent
Ding et al.

(10) Patent No.: US 11,501,371 B2
(45) Date of Patent: Nov. 15, 2022

(54) DISTRIBUTED ENERGY TRANSACTION MATCHING METHOD BASED ON ENERGY NETWORK CONSTRAINTS AND MULTIPLE KNAPSACK MODEL

(71) Applicants: Xi'an Jiaotong University, Xi'an (CN); Northwest Branch of State Grid Corporation of China, Xi'an (CN); Electric Power Research Institute of State Grid Shaanxi Electric Power Company, Xi'an (CN)

(72) Inventors: Tao Ding, Shanghai (CN); Jiangbin Dong, Xi'an (CN); Chenggang Mu, Xi'an (CN); Ming Qu, Xi'an (CN); Ke'er Ning, Xi'an (CN); Xiaobo Dong, Xi'an (CN); Jie Qi, Xi'an (CN); Xiaomeng Zhang, Xi'an (CN); Yuankang He, Xi'an (CN); Tian'en Chen, Xi'an (CN); Yongqing Wang, Xi'an (CN); Jian Liu, Xi'an (CN)

(73) Assignee: XI'AN JI'AOTONG UNIVERSITY, Xi'an (CN)

( * ) Notice: Subject to any disclaimer, the term of this patent is extended or adjusted under 35 U.S.C. 154(b) by 0 days.

(21) Appl. No.: 16/950,268

(22) Filed: Nov. 17, 2020

(65) Prior Publication Data
US 2021/0304307 A1  Sep. 30, 2021

(30) Foreign Application Priority Data
Mar. 26, 2020 (CN) .......................... 202010222801.8

(51) Int. Cl.
*G06Q 40/04* (2012.01)
*G06Q 50/06* (2012.01)
(Continued)

(52) U.S. Cl.
CPC ......... *G06Q 40/04* (2013.01); *G06F 16/2379* (2019.01); *G06Q 10/04* (2013.01);
(Continued)

(58) Field of Classification Search
CPC .... G06Q 20/405; G06Q 20/389; G06Q 50/06; G06Q 30/08; G06Q 10/04; G06Q 10/103;
(Continued)

(56) References Cited

U.S. PATENT DOCUMENTS 9,367,052 B2 *   6/2016  Steven .................. G06Q 40/04
2011/0238552 A1 * 9/2011  Monogioudis ......... G06Q 40/04
                                                        705/37
(Continued)

FOREIGN PATENT DOCUMENTS

| CN | 105846443 B   | * | 3/2018  | ............ H02J 3/1871 |
| EP | 3193299 A1    | * | 7/2017  | ......... G06Q 20/3829  |
| JP | 2019169106 A  | * | 10/2019 | ............. G06Q 50/06 |

OTHER PUBLICATIONS

Khorasany et al.: Peer-to-peer Market Clearing Framework for Distributed Energy Resources (DERs) using Knapsack Approximation Algorithm, 2017, pp. 1-7 (Year: 2017).*
(Continued)

*Primary Examiner* — Bijendra K Shrestha
(74) *Attorney, Agent, or Firm* — Andrew C. Cheng

(57) ABSTRACT

This invention provides a distributed energy transaction matching method based on energy network constraints and multiple knapsack model. First, it considers the matching between financial market transactions and actual energy network scheduling, then generates security constraints on the results of distributed transactions. Next, it designs a multiple knapsack model for peer-to-peer distributed transactions, which can meet the common quotation needs of users or producers who issue transactions and achieve
(Continued)

efficient matching under energy network security checks. Finally, the model is verified based on the blockchain Ethereum smart contract test verification. This method provides new ideas for the connection between distributed energy trading and actual physical dispatch, proposes an inclusive and efficient matching model for the point-to-point distributed trading market, which has great reference value for the connection between distributed energy trading and actual conditions.

4 Claims, 4 Drawing Sheets

(51) Int. Cl.
*G06Q 10/04* (2012.01)
*G06Q 30/08* (2012.01)
*G06Q 20/38* (2012.01)
*G06Q 20/40* (2012.01)
*G06F 16/23* (2019.01)
*H02J 3/00* (2006.01)
*G06Q 10/10* (2012.01)

(52) U.S. Cl.
CPC ......... *G06Q 10/103* (2013.01); *G06Q 20/389* (2013.01); *G06Q 20/405* (2013.01); *G06Q 30/08* (2013.01); *G06Q 50/06* (2013.01); *H02J 3/00* (2013.01); *H02J 2203/20* (2020.01)

(58) Field of Classification Search
CPC ........ G06Q 40/04; H02J 3/00; H02J 2203/20; G06F 16/2379
See application file for complete search history.

(56) References Cited

U.S. PATENT DOCUMENTS

| | | | |
|---|---|---|---|
| 2012/0029720 A1* | 2/2012 | Cherian | G06Q 50/06 700/297 |
| 2020/0234250 A1* | 7/2020 | Farivar | G06Q 10/06313 |
| 2021/0035058 A1* | 2/2021 | Warrum | G06Q 30/0205 |

OTHER PUBLICATIONS

Khorasany et al.: Market Framework for Local Energy Trading: A review of Potential Designs and Market Gearing Approaches, Nov. 20, 2018, IET Generation, Transmission and Distribution, vol. 12, Issue 22, pp. 1-36 (Year: 2018).*

Rahim et al.: Towards Multiple Knapsack Problem Approach for Home Energy Management in Smart Grid, 2016, IEEE, 18th International Conference on Network-Based Information Systems, pp. 48-52 (Year: 2016).*

* cited by examiner

DISTRIBUTED ENERGY TRANSACTION MATCHING METHOD BASED ON ENERGY NETWORK CONSTRAINTS AND MULTIPLE KNAPSACK MODEL

FIELD OF THE INVENTION

The invention belongs to the field of distributed energy trading and particularly relates to quantitative guidance for distributed trading and actual energy dispatch matching rules, and point-to-point energy trading models.

BACKGROUND OF THE INVENTION

With the gradual promotion of distributed energy trading, more and more energy trading links are deployed among users, and a financial-based energy trading market is established. The energy network can perform actual physical transactions for users based on the results of financial market transactions. The transmission has greatly improved the mobility of energy and promoted reform and development in the energy sector.

However, there are still many difficulties in matching transactions and scheduling. Point-to-point transactions between users do not care about the actual physical constraints, while energy network scheduling is a process that needs to meet the physical realization of each energy network, that is, the actual physical constraints and energy flow constraints are strictly considered in the optimal scheduling. Therefore, the actual transaction contract may not completely match the security dispatch. The energy trading system needs to interact with the dispatch during the design process, taking into account the constraints issued by the dispatch.

At the same time, the matching in distributed transactions is a point-to-point problem. How to match and meet the quotation needs of multiple users at the same time has not been solved well. Traditional transactions are executed based on the transaction center, which cannot guarantee the clarity of the process and security. The above-mentioned problems must be solved to promote distributed transactions. Otherwise, the willingness of ordinary users and energy producers to enter the distributed trading market will be greatly weakened, and the distributed transaction cannot be truly realized.

SUMMARY OF THE INVENTION

To solve the problems above, the purpose of the invention is to provide a distributed energy transaction matching method based on energy network constraints and multiple knapsack model and implement algorithms based on blockchain technology to solve the existing problems in distributed transactions, providing new solutions for distributed energy trading and scheduling matching and peer-to-peer transaction matching.

To achieve the above objective, the invention adopts the following technical solutions:

The distributed energy transaction matching method includes the following steps:

(1) By designing an augmented optimization model of energy scheduling, the transaction volume of users is restricted to the smaller value of the declared volume and the energy network limit volume to add security checks for distributed transactions;

(2) Based on the traditional single knapsack model, for the goal of maximizing market transaction value, design a multiple knapsack model fit more with point-to-point transactions to match transactions between multiple buyers and sellers.

The method for matching distributed energy transactions based on energy network constraints and multiple knapsack problems, wherein the augmented optimization model in step (1) is:

$$\begin{cases} \max_{x,y} f(x, y) + \rho^T(y^{sp} - y) \\ \text{s.t. } g_i(x, y) = 0, i = 1, \ldots, N_{eq} \\ h_j(x, y) \leq 0, j = 1, \ldots, N_{ieq} \\ 0 \leq y \leq y^{sp} \end{cases}$$

Where x is the decision variable of the system, y is the load and energy production of the system, $y^{sp}$ is the transaction energy volume determined by the contract, $y=y^{sp}$ indicates that the system's scheduling boundary condition is the transaction volume determined by the contract, and $g_i$ and $h_j$ are equality and inequality constraints of network system security. The augmented optimization model takes y as the system optimization variable, considers the modification of the existing transaction volume, and ensures that the modification amount is as small as possible so that the impact on the transaction is smaller. After the energy network is checked, the correction amount of the transaction can only reduce or cancel the transaction volume, but cannot force the user to increase transaction volume, so the constraint of $0 \leq y \leq y^{sp}$ is obtained.

The method for matching distributed energy transactions based on energy network constraints and multiple knapsack model, wherein the objective function of the multiple knapsack model in step (2) is:

$$\begin{cases} \max_{P_g, P_d} \sum_{j=1}^{N_d} \lambda_{d,j} P_{d,j} - \sum_{i=1}^{N_g} \lambda_{g,i} P_{g,i} \\ \text{s.t. } \sum_{i=1}^{N_g} P_{g,i} = \sum_{j=1}^{N_d} P_{d,j} \\ 0 \leq P_{g,i} \leq P_{g,i}^{max}, 0 \leq P_{d,j} \leq P_{d,j}^{max} \end{cases}$$

$\lambda_{d,j}$ is the price of the $j^{th}$ user, $\lambda_{g,i}$ is the price of the $i^{th}$ producer, $P_{d,j}$ is the matched transaction volume of the $j^{th}$ user, $P_{g,i}$ the matched transaction volume of the $j^{th}$ producer, $N_g$ and $N_d$ is the number of producers and users, $P_{d,j}^{max}$ and $P_{g,i}^{max}$ is the maximum possible transaction volume of the $j^{th}$ user and $i^{th}$ producer.

The method for matching distributed energy transactions based on energy network constraints and multiple knapsack model, characterized in that the solving algorithm of the multiple knapsack model is described as:

Convert the point-to-point energy transaction into a multiple knapsack problem. When $N_d > N_g$, there are $N_d$ kinds of commodities placed in $N_g$ boxes with a capacity of $P_{g,i}^{max}$ one after another. The weight of each commodity j is $P_j$, and the value of unit weight is $\lambda_j$. The value of the goods is sorted from high to low, and the high-value goods are placed first until the weight reaches the requirement, the next box is replaced and the execution is repeated. When $N_d \leq N_g$, $N_g$ types of goods are placed in $N_d$ boxes with a capacity of $P_{d,j}^{max}$ one after another. The weight of a commodity i is $P_i$, and the value of unit weight is $\lambda_i$. Sort the value of the commodity from small to large, and put the small value commodity first, until the weight reaches the requirement, change the box and repeat the execution until the condition is not met.

A distributed energy transaction matching method based on energy network constraints and multiple knapsack model is characterized in that the multiple knapsacks solve the point-to-point transaction problem, which is used in conjunction with the decentralized blockchain technically similar features, the algorithm of the multiple knapsack model is written in the Ethereum smart contract using the "Solidity" to solve.

The beneficial effects of the invention are embodied in:

(1) The invention proposes a distributed energy transaction matching method based on energy network constraints and multiple knapsack model. This method can effectively solve the problem of the current energy transaction market and actual dispatching mismatch, imperfect transaction mode, etc. Also, it provides solutions for distributed trading algorithms in blockchain technology.

(2) The invention can add safety checks based on a direct matching of traditional energy transactions, fully consider the scheduling limitations of the energy network, ensure that the transaction results of the financial market meet the realization of actual physical transmission, and solve the matching problem of transactions and scheduling.

(3) The present invention can propose multiple knapsack models for point-to-point multi-party transactions based on the traditional knapsack problem to satisfy market demand and user quotation requirements. At the same time, it is realized based on decentralized blockchain technology to ensure that the transaction process is clear and transparent, safe, and reliable. It can be used in energy distributed trading occasions, so engineering personnel can carry out relevant research work accordingly.

DETAILED DESCRIPTION OF THE INVENTION

Further details of the invention are given below in conjunction with the appended drawings and embodiments:

1. The distributed energy transaction matching method based on energy network constraints and multiple knapsack model is implemented through the following steps:

(1) An Augmented Optimization Model for Energy Dispatch

Purely distributed transactions cannot consider the actual operation of energy grid scheduling, because all users cannot fully understand the accurate energy grid model and physical operation mechanism. However, energy trading is often constrained by the safe operation of the actual energy network. Therefore, the matching of trading and scheduling must be considered. The traditional optimal scheduling model of energy can be expressed as (1), where x is the decision variable of the system, y is the load and energy production of the system, $y^{sp}$ is the transaction energy amount determined by the contract, and $y=y^{sp}$ indicates that the system's scheduling boundary condition is the transaction volume determined by the contract. $g_i$ and $h_j$ are equality and inequality constraints of network system security.

$$\begin{cases} \max_{x} f(x, y) \\ \text{s.t. } g_i(x, y) = 0, i = 1, \ldots, N_{eq} \\ h_j(x, y) \le 0, j = 1, \ldots, N_{ieq} \\ y = y^{sp} \end{cases} \quad (1)$$

Figure 1:
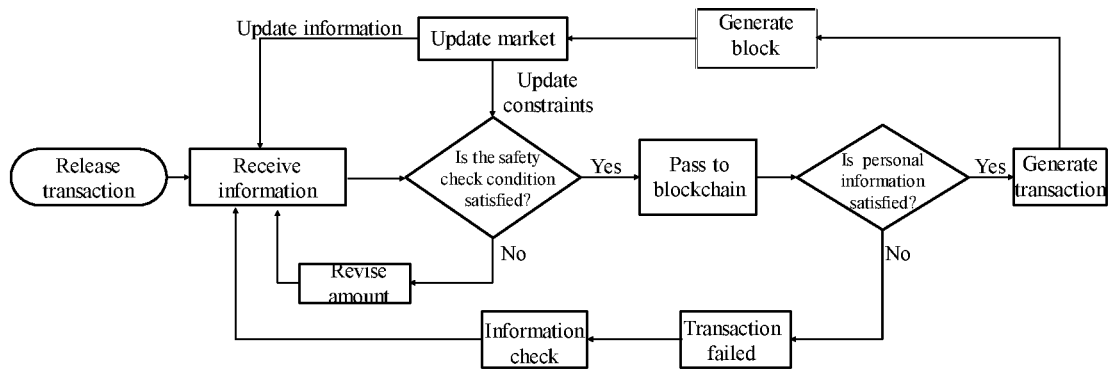
FIG. 1 is the flow chart of the energy network security check.

However, the optimal scheduling model has no feasible solution, which means that for scheduling under a given energy transaction volume, the safe operation constraints will be violated. Therefore, the dispatch needs to check the energy transaction volume to form the following augmented optimization model. Users trade with each other, and at the same time the trading platform interacts with the energy network, check the security of the physical stream transmission. The final transaction result is distributed on the blockchain. The entire process is shown in FIG. 1.

$$\begin{cases} \max_{x,y} f(x, y) + \rho^T(y^{sp} - y) \\ \text{s.t. } g_i(x, y) = 0, i = 1, \ldots, N_{eq} \\ h_j(x, y) \le 0, j = 1, \ldots, N_{ieq} \\ 0 \le y \le y^{sp} \end{cases} \quad (2)$$

Among them, the augmented optimization model takes y as the optimization variable of the system, considering the modification of the existing transaction volume, and ensures that the modification amount is as small as possible, so that the impact on the transaction is smaller. It should be noted that after the energy network is checked, the correction amount of the transaction can only reduce or cancel the transaction volume, but cannot force the user to increase transaction volume, so the constraint of $0 \le y \le y^{sp}$ is obtained.

(2) Multiple Knapsack Model Design Process Under a Safety Check

1) Establish an Initial Transaction Matching Model

In the matching stage, the same subject can be both producer and consumer in different periods, but the subject can only have one identity at one trading node. In this case, the main task of the energy trading system is to match the amount of energy to the greatest extent, while satisfying some transaction volume constraints given by the energy network check, so that more transactions are successful, and the transaction price is determined according to the market quotation. Set $\lambda_{d,j}$ as the quotation of the $j^{th}$ user, $\lambda_{g,i}$ as the quotation of the $i^{th}$ producer, $P_{d,j}$ as the matching transaction volume of the $j^{th}$ user, and set $P_{g,i}$ as the matching transaction volume of the $i^{th}$ producer. $N_g$ and $N_d$ are the numbers of producers and users. Because the transaction to be matched originates from the multi-party participants of the energy trading platform, the quotations of the buyer and the seller can be generated at any time, and the transaction can be completed once the price matches, it is attributed to a continuous double auction mechanism.

First, confirm the supply and demand relationship based on the current market volume. When $N_d > N_g$ it is the situation when demand exceeds supply. When $N_d \le N_g$ it is the situation when supply exceeds demand. Based on this, the following matching transaction model is established.

$$\begin{cases} \max_{P_g, P_d} \sum_{j=1}^{N_d} \lambda_{d,j} P_{d,j} - \sum_{i=1}^{N_g} \lambda_{g,i} P_{g,i} \\ \text{s.t.} \sum_{i=1}^{N_g} P_{g,i} = \sum_{j=1}^{N_d} P_{d,j} \\ 0 \le P_{g,i} \le P_{g,i}^{max}, 0 \le P_{d,j} \le P_{d,j}^{max} \end{cases} \quad (3)$$

Among them, $P_{d,j}^{max}$ and $P_{g,i}^{max}$ is the maximum possible transaction volume of the $j^{th}$ user and the $i^{th}$ producer, and determined by:

$$P_{g,i}^{max} = \min(U_{g,i}, P_{g,i}^{bid}), P_{d,j}^{max} = \min(U_{d,j}, P_{d,j}^{bid}) \quad (4)$$

$P_{d,j}^{bid}$ and $P_{g,i}^{bid}$ are declaration amount of the $j^{th}$ user and the $i^{th}$ producer, $U_{d,j}$ and $U_{g,i}$ are limits of the $j^{th}$ user and the $i^{th}$ producer after energy network dispatch checking.

2) Design Multiple Knapsack Solution Ideas

It can be seen that the above optimization model is a linear optimization problem with only one equality constraint and upper and lower bound constraints. Such a special linear optimization problem is transformed into a continuous knapsack problem. When supply exceeds demand, $N_d > N_g$, the problem can be described from the perspective of the knapsack problem as: We have $N_d$ kinds of commodities placed in $N_g$ boxes with a capacity of $P_{g,i}^{max}$ one after another. The weight of each commodity j is $P_j$, and the value of unit weight is $\lambda_j$, then how to load commodities to maximize the total value? The solution idea of the algorithm is: sort the value of the goods from high to low, and place the goods of high value first until the weight reaches the requirement. When $N_d \le N_g$, there are $N_g$ kinds of commodities placed in $N_d$ boxes with a capacity of $P_{d,j}^{max}$ one after another. The weight of each commodity i is $P_i$, and the value of unit weight is $\lambda_i$. The value of the commodities is sorted from low to high, and the low value is first installed. Then change the box and repeat until the conditions are not met.

3) Algorithm Solution Design Based on Blockchain Smart Contract

Definition i. The corresponding transaction volume of the $i^{th}$ producer and the $j^{th}$ user which constitutes a i×j dimensional transaction volume matrix P;
ii. The corresponding transaction price of the $i^{th}$ producer and the $j^{th}$ user is $\lambda_{ij}$, which constitutes a i×j dimensional transaction volume matrix $\lambda$;
iii. The remaining amount of the $i^{th}$ producer's transaction is $P_{g,i}^{\Delta}$;
iv. The remaining transaction amount of the $j^{th}$ user is $P_{d,j}^{\Delta}$.

Input: The maximum possible transaction volume and quotation of both buyers and sellers, as the following matrix:

$$\begin{cases} P_d = (P_{d,1}^{max}, P_{d,2}^{max}, \ldots, P_{d,N_d}^{max})^T \\ P_g = (P_{g,1}^{max}, P_{g,2}^{max}, \ldots, P_{g,N_g}^{max})^T \\ \lambda_d = (\lambda_{d,1}, \lambda_{d,2}, \ldots, N_{d,N_d})^T \\ \lambda_g = (\lambda_{g,1}, \lambda_{g,2}, \ldots, \lambda_{g,N_g})^T \end{cases} \quad (5)$$

Output: Transaction volume matrix P and transaction price matrix $\lambda$.

Initialize: i=1; j=1; P=0; $\lambda$=0.

Run:

| | |
|---|---|
| 1 | IF $N_d > N_g$, then: |
| 2 | Sort from largest to smallest for $\lambda_d$, the sort set is |
| | $\lambda_{l_1}, \lambda_{l_2}, \ldots, \lambda_{l_{N_d}}$; |
| 3 | IF $i \le N_g$, then: |
| 4 | $P_{g,i}^{\Delta} = P_{g,i}^{max}$; $P_{d,j}^{\Delta} = P_{d,j}^{max}$; |
| 5 | When $P_{g,i}^{\Delta} - P_{ij} \ge 0$ and $\lambda_{l_j} \ge \lambda_{g,i}$, repeat execution: |
| 6 | $P_{ij} \leftarrow P_{l_j}$; |
| 7 | $P_{g,i}^{\Delta} \leftarrow P_{g,i}^{\Delta} - P_{ij}$; |
| 8 | $P_{d,j}^{\Delta} \leftarrow 0$; |
| 9 | $j \leftarrow j + 1$; |
| 10 | Or: |
| 11 | $P_{ij} \leftarrow P_{g,i}^{\Delta}$; |
| 12 | $P_{g,i}^{\Delta} \leftarrow 0$; |
| 13 | $P_{d,j}^{\Delta} \leftarrow P_{d,j}^{\Delta} - P_{ij}$; |
| 14 | $i \leftarrow i + 1$; |
| 15 | Or: |
| 16 | $\lambda_{ij} = \begin{cases} \lambda_{d,j} & P_{ij} > 0 \\ 0 & P_{ij} = 0 \end{cases}, j = 1, 2, \ldots, N_d$ |
| 17 | End |
| 18 | IF $N_d \le N_g$, then: |
| 19 | Sort from smallest to largest for $\lambda_g$, the sort set is |
| | $\lambda_{l_1}, \lambda_{l_2}, \ldots, \lambda_{l_{N_g}}$; |
| 20 | IF $j \le N_d$, Then: |
| 21 | $P_{d,j}^{\Delta} = P_{d,j}^{max}$; $P_{g,i}^{\Delta} = P_{g,i}^{max}$; |
| 22 | When $P_{d,j}^{\Delta} - P_{ij} \ge 0$ and $\lambda_{l_i} \le \lambda_{d,j}$, repeat execution: |
| 23 | $P_{ij} \leftarrow P_{l_i}$; |
| 24 | $P_{d,j}^{\Delta} \leftarrow P_{d,j}^{\Delta} - P_{ij}$; |
| 25 | $P_{g,i}^{\Delta} \leftarrow 0$; |
| 26 | $i \leftarrow i + 1$; |
| 27 | Or: |
| 28 | $P_{ij} \leftarrow P_{d,j}^{\Delta}$; |
| 29 | $P_{d,j}^{\Delta} \leftarrow 0$; |
| 30 | $P_{g,i}^{\Delta} \leftarrow P_{g,i}^{\Delta} - P_{ij}$; |
| 31 | $j \leftarrow j + 1$; |
| 32 | Or: |
| 33 | $\lambda_{ij} = \begin{cases} \lambda_{g,i} & P_{ij} > 0 \\ 0 & P_{ij} = 0 \end{cases}, i = 1, 2, \ldots, N_g$ |
| 34 | End |

Further, we can get a) The optimal transaction volume for users and producers is $$\begin{cases} P_{g,i}^* = P_{g,i}^{max} - P_{g,i}^{\Delta}, i = 1, 2, \ldots, N_g \\ P_{d,j}^* = P_{d,j}^{max} - P_{d,j}^{\Delta}, j = 1, 2, \ldots, N_d \end{cases} \quad (6)$$

b) When $N_d > N_g$, transaction income of the $i^{th}$ producer is $$\sum_{j=1}^{N_d} \lambda_{ij} P_{ij},$$

j=1, 2, ..., $N_d$, which is $$\sum_{j=1}^{N_d}(\lambda_{ij}-\lambda_{g,i})P_{ij}, j=1, 2, \ldots, N_d$$

higher than expected earnings of the quoted price.

c) When $N_d \leq N_g$, Transaction outcome of the $j^{th}$ user is $$\sum_{i=1}^{N_g}\lambda_{ij}P_{ij},$$

i=1, 2, ..., $N_g$, which is $$\sum_{i=1}^{N_g}(\lambda_{d,j}-\lambda_{ij})P_{ij}, i=1, 2, \ldots, N_g$$

lower than the expected cost of the quoted price.

(3) Analysis of Interaction Between Energy Network and Blockchain System

Figure 2:
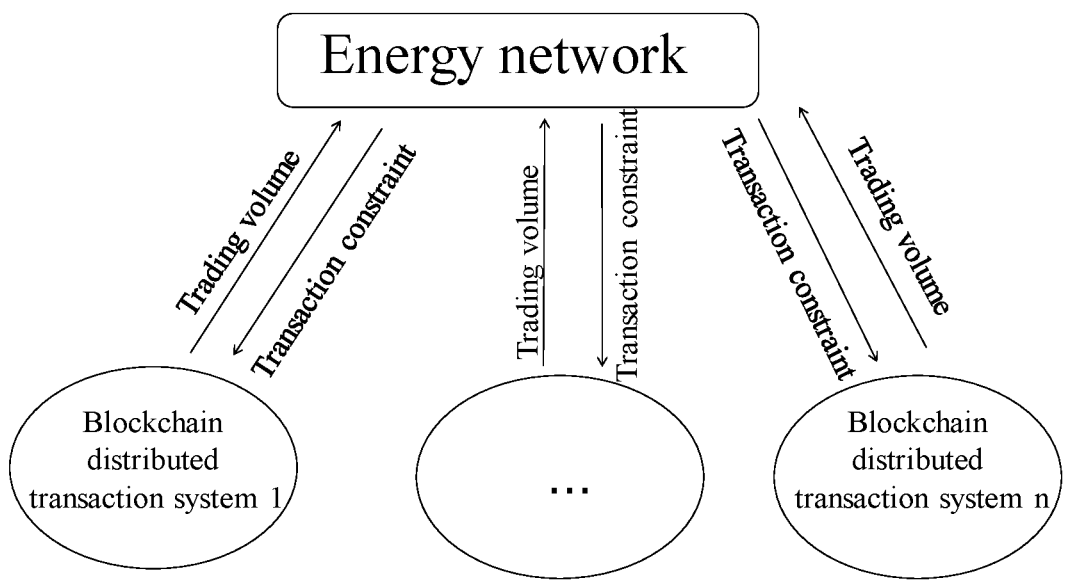
FIG. 2 is the diagram of the transaction matching process.

Further, consider the interaction of energy network constraints and blockchain systems as shown in FIG. 2. After the energy trading system obtains the amount of the transaction to be matched, upload it to the energy network for safety verification. If the verification is passed, the smart contract command is triggered to facilitate the transaction. If the transaction fails, the energy network will return the transaction volume constraint, and similarly, multiple blockchain systems can interact with the energy network.

At the beginning of the transaction, it is possible to directly match the transaction without considering the network security constraints to obtain the result of the matchmaking transaction $y_0^{sp}=(P_{g,i}^*, P_{d,j}^*)$. If the check is unsuccessful, execute the augmented optimization model (2), and the result must be $y_0^* \leq y_0^{sp}$. The transaction volume constraint $y_0^*$ is transferred to the matching model. According to (4), it can be seen that the result of the matching transaction meets the feasibility of the model, and there must be $y_1^{sp} \leq y_0^*$. Further, there are $y_1^{sp} \leq y_0^* \leq y_0^{sp}$. It can be seen that with the iteration of the energy network and the blockchain transaction system, a sequence $(y_0^{sp}, y_1^{sp}, \ldots)$ can be obtained. The sequence is monotonically decreasing and has a lower bound, that is, the Cauchy sequence, so it must converge.

2. Case Analysis

After the method of the invention is realized based on the smart contract of blockchain, the following scenario is set up: in this calculation example, there are 13 users, including 8 sellers and 5 buyers, simulating the market situation as oversupply. Assuming that there are already 8 sellers and 5 buyers in the market and post transactions in sequence to Table 1. It is stipulated that the type of energy traded is testing energy, and the transaction volume applied by 13 users is generated at their own will. The quotation range for the test energy is between 30.00 and 50.00 cents.

(1) Comparison Between the Situation with or without Energy Network Constraints

First, transaction results that do not consider energy network security constraints are shown in Table 1, it can be seen that some users with reasonable prices have successfully traded.

TABLE 1

| Information released by users | | | | |
|---|---|---|---|---|
| | State | Amount (kw · h) | Remaining amount (kw · h) | Release price (cents) |
| Buyer | | | | |
| A | Finished | 350 | 0 | 38.00 |
| B | Finished | 300 | 0 | 40.00 |
| C | Unfinished | 450 | 450 | 35.00 |
| D | Finished | 500 | 0 | 39.00 |
| E | Finished | 500 | 0 | 46.00 |
| Seller | | | | |
| F | Finished | 200 | 0 | 31.00 |
| G | Finished | 450 | 0 | 39.00 |
| H | Unfinished | 50 | 50 | 46.00 |
| I | Finished | 150 | 0 | 34.00 |
| J | Finished | 200 | 0 | 43.00 |
| K | Unfinished | 150 | 150 | 44.00 |
| L | Finished | 350 | 0 | 37.00 |
| M | Finished | 300 | 0 | 33.00 |

Figure 3:
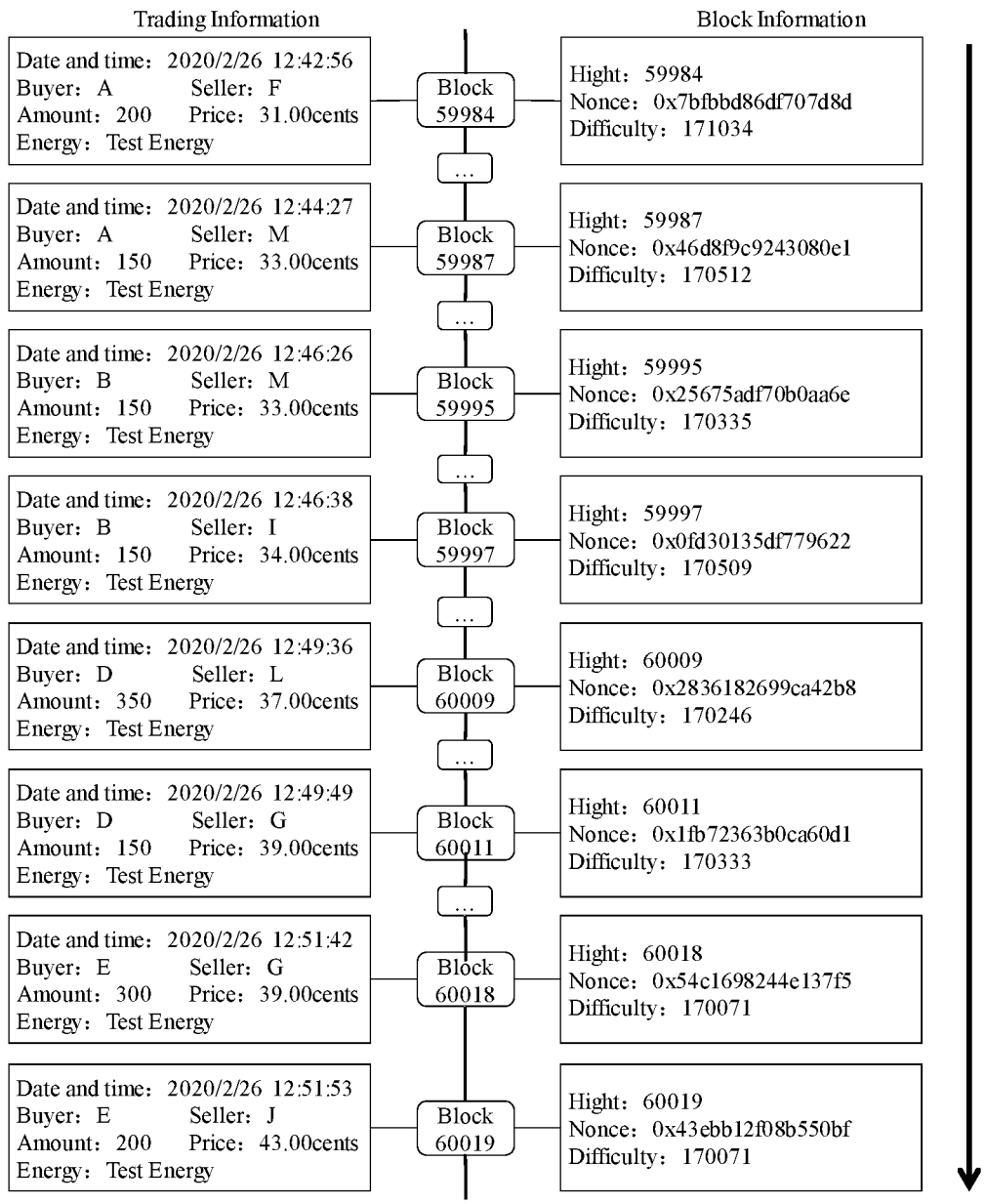
FIG. 3 shows the matching results without energy grid verification in the calculation example.

Next, get the results of all matched transactions in the blockchain. Eight successful transactions generate new blocks, and the generated information is divided into transaction information and block information, as shown in FIG. 3. Here the block height, Nonce and Difficulty in the block information are displayed.

Figure 4:
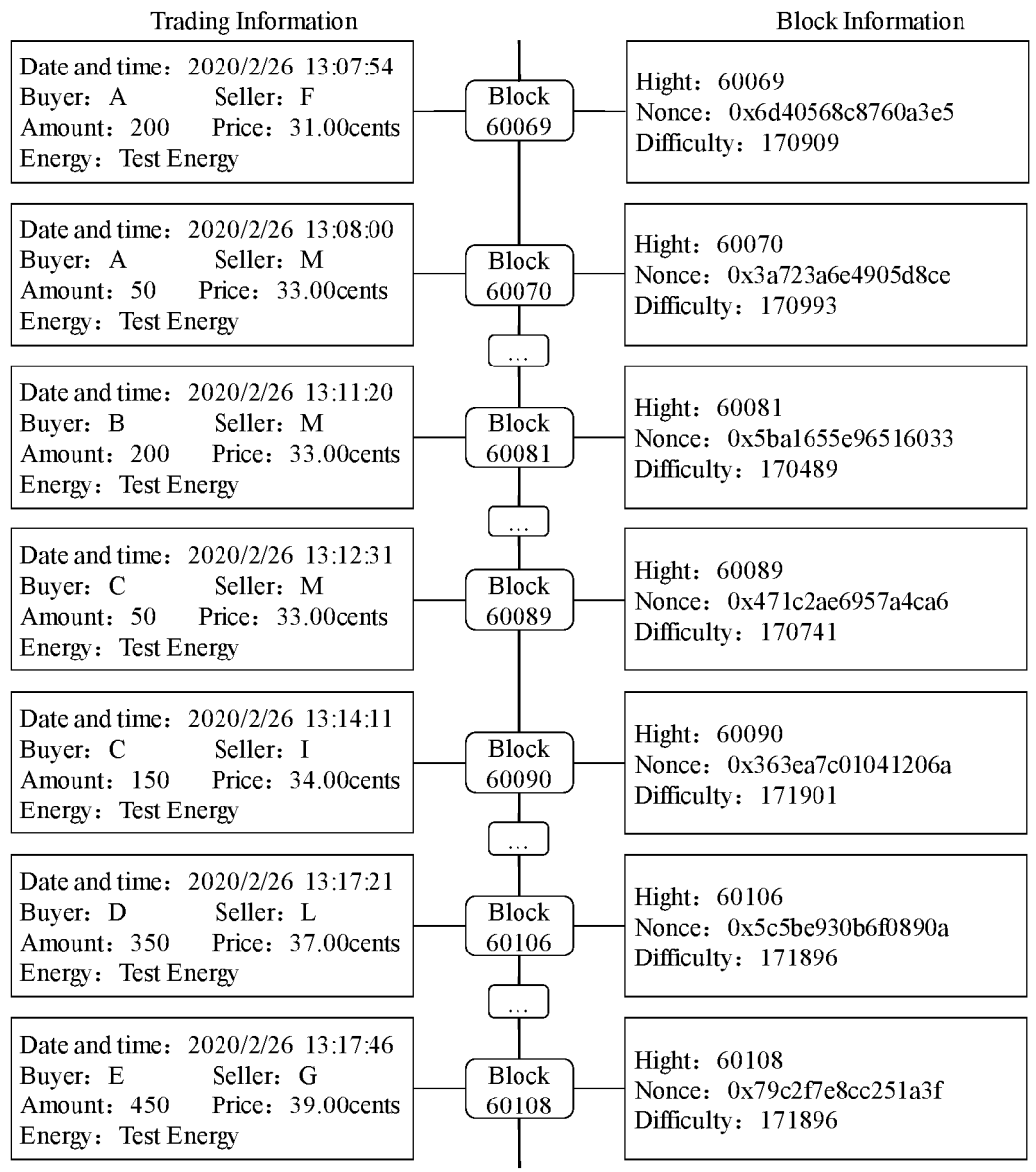
FIG. 4 shows the matching results with energy network verification.

Furthermore, suppose that the actual trading volume of 5 buyers is constrained by the security of the energy network, and the constraints are shown in Table 2. New transaction results are shown in FIG. 4. It can be seen that the transaction results with or without energy network constraints are different. Take users A and B as an example, in unconstrained condition, users A and B bought all energy sold by users F, M, and I, resulting in user C could not match the energy that meets the quotation, and his transaction failed. In constraints of the energy network, the purchase volume of A and B was constrained, also, M and I still had surplus energy, and C successfully bought in batches. It can be seen that results that contain energy network constraints are more in line with actual physical conditions.

TABLE 2

| Energy network constraints and correction values | | | | | |
|---|---|---|---|---|---|
| | Users | | | | |
| | A | B | C | D | E |
| Initially Volume (kw · h) | 350 | 300 | unsettled | 500 | 500 |
| Constrained Volume (kw · h) | 250 | 200 | 200 | 350 | 450 |
| Final Volume (kw · h) | 250 | 200 | 200 | 350 | 450 |

(2) Analysis of Actual Transaction Results

Figure 5:
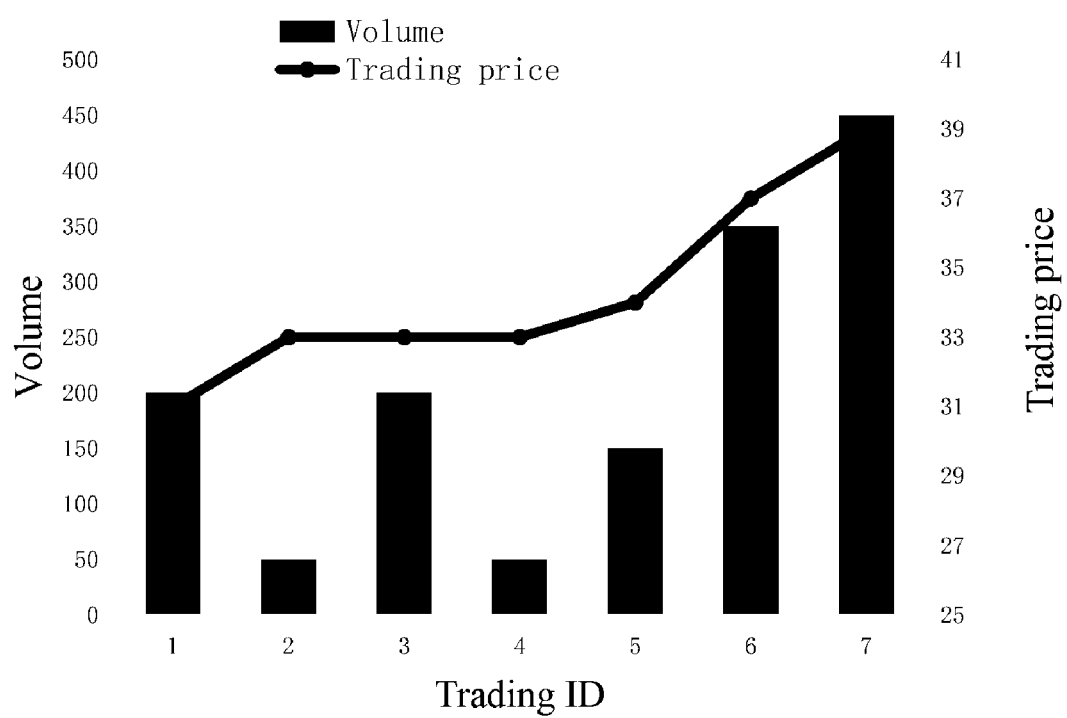
FIG. 5 shows the results of the final 7 successful transactions.

From the above transaction information, it can be seen that in the whole process, 7 transactions were finally completed in sequence. The transaction volume and transaction price are shown in FIG. 5 in order. As buyers entered the market, low-cost energy had been sold off, and the transaction price gradually increased. The transaction volume was determined by the need of buyers and sellers. At the same time, in such a market where supply exceeded demand, buyers had more initiative. After buyers entered the market, the system would sort all the current sellers' quotations from low to high, and matched them with buyers in turn.

For example, user A asked for purchase at 38.00 (cents) and release volume of 250 (kw·h), and finally succeeded at 31.00 (cents) for 200 (kw·h) and 33.00 (cents) for 50 (kw·h), that is, buyers' purchase price was less than or equal to his published price. Of course, the sellers' purchase price would not be lower than his published price, which is in line with the expectation of matching results. Besides, some users' quotations were too deviated to complete a transaction. For example, users C and D, after entering the market, the amount of energy available to meet their published prices was less than their needs, so only part of the transaction could be traded, and the rest part would continue to be saved in the market waiting for conditions to be met.

For sellers, H, J, K, the reason they did not complete the transaction is that user H's selling price was higher than all buyers' quotations at that time, so it would not be matched. Although quotations were relatively suitable for users J, K, there were competitors with lower selling prices in the market and the quantity meet needs of buyers, so there was no transaction.

Furthermore, the transaction cost is further quantitatively analyzed in Table 3. The preferential rate represents the ratio of the actual cost to the expected cost. It can be seen that all 5 buyers have received different discounts.

TABLE 3

Transaction cost analysis

| | Users | | | | |
|---|---|---|---|---|---|
| | A | B | C | D | E |
| Expected cost (cerds) | 9500 | 8000 | 7000 | 13650 | 20700 |
| Actual cost (ccats) | 7850 | 6600 | 6750 | 12950 | 17550 |
| Discount rate (%) | 82.63 | 82.5 | 96.43 | 94.87 | 84.78 |

Actual calculation examples above can summarize that: 1) The entire transaction process is implemented according to the logic designed by the smart contract and energy trading system, and it scientifically complies with energy network security check and analyzes user's quotations based on the market situation; 2) Based on the blockchain technology, the energy trading platform can let each transaction data on the chain to generate blocks, and the block data is open and transparent; 3) While protecting interests of both parties, it can save costs, improve transaction efficiency and user experience.

The invention claimed is:

1. A distributed energy transaction matching and dispatching method based on energy network constraints and a multiple knapsack model, comprising:
   restricting a maximum possible transaction volume of each of users including buyers and sellers, through an energy trading platform and a blockchain distributed transaction systems all connected with an energy network, to be a smaller value of a declared volume and an energy network limit volume through security checks for distributed transactions on the energy network according to an augmented optimization model of energy scheduling,
   wherein the augmented optimization model is configured to take y as a system optimization variable, consider a modification of an existing transaction volume, and ensure that a modification amount is as small as possible making an impact on transaction is smaller;
   obtaining a constraint condition of $0 < y < y^{sp}$ preventing a mismatch between a current energy transaction market and an actual dispatching by restricting the modification amount of transaction being only capable of reducing or cancelling the existing transaction volume rather than forcing the user to increase transaction volume after the energy network is checked, wherein the augmented optimization model is:

$$\begin{cases} \max_{x,y} f(x, y) + \rho^T(y^{sp} - y) \\ \text{s.t. } g_i(x, y) = 0, i = 1, \ldots, N_{eq} \\ h_j(x, y) \leq 0, j = 1, \ldots, N_{ieq} \\ 0 \leq y \leq y^{sp} \end{cases},$$

where x is a decision variable of each of the distributed transaction systems, y is a load and energy production of each of the distributed transaction systems, $y^{sp}$ is a transaction energy volume determined by an Ethereum contract, $y = y^{sp}$ indicates that a scheduling boundary condition of each of the distributed transaction systems is the transaction energy volume determined by the Ethereum contract, and $g_i$ and $h_j$ are respectively equality and inequality constraints of energy network security;

matching transactions between the buyers and the sellers, by a energy trading system according to the maximum possible transaction volumes of the users and quotations of the buyers and the sellers and obtaining transaction results for the users according to a solving algorithm of the multiple knapsack model fit with peer-to-peer transactions;

uploading the matched transaction, by the energy trading system to the energy network for safety verification based on energy constraints of the declared volume and the energy network limit volume;

verifying the matched transaction with the energy constraints and facilitating the transaction by smart contract of a blockchain distributed transaction system; and performing, by the energy network, actual physical stream transmissions of energy for the users based on the verified matched transaction results.

2. The distributed energy transaction matching and dispatching method according to claim 1, wherein an objective function of the multiple knapsack model is:

$$\begin{cases} \max_{P_g, P_d} \sum_{j=1}^{N_d} \lambda_{d,j} P_{d,j} - \sum_{i=1}^{N_g} \lambda_{g,i} P_{g,i} \\ \text{s.t. } \sum_{i=1}^{N_g} P_{g,i} = \sum_{j=1}^{N_d} P_{d,j} \\ 0 \leq P_{g,i} \leq P_{g,i}^{max}, 0 \leq P_{d,j} \leq P_{d,j}^{max} \end{cases}$$

where $\lambda_{d,j}$ is the quotation of a $j^{th}$ buyer, $\lambda_{g,i}$ is the quotation of an $i^{th}$ seller, $P_{d,j}$ is a matched transaction volume of the $j^{th}$ buyer, $P_{g,i}$ a matched transaction volume of the $j^{th}$ seller, $N_g$ and $N_d$ are respectively the numbers of the sellers and buyers, $P_{d,j}^{max}$ and $P_{g,i}^{max}$ are respectively maximum possible transaction volumes of the $j^{th}$ buyer and $i^{th}$ seller.

3. The distributed energy transaction matching and dispatching method according to claim 2, wherein the solving algorithm of the multiple knapsack model is described as:
   converting the peer-to-peer energy transaction into a multiple knapsack problem; wherein when $N_d > N_g$, placing $N_d$ kinds of commodities into $N_g$ boxes with a capacity of $P_{g,i}^{max}$ one after another, where a weight of each commodity j is $P_j$, and a value of unit weight is $\lambda_j$; sorting values of the commodities from high to low, placing a high-value commodity first into the boxes until the weight reaches requirements, and repeating a same execution to a next box until the requirements are not met;

wherein when $N_d \leq N_g$, placing $N_g$ kinds of goods into $N_d$ boxes with a capacity of $P_{d,j}^{max}$ one after another, where a weight of each commodity i is $P_i$, and a value of unit weight is $\lambda_i$; sorting values of the commodities from small to large, placing a small value commodity first until the weight reaches requirements, and repeating a same execution to a next box until the requirements are not met.

4. The distributed energy transaction matching and dispatching method according to claim 3, wherein the multiple knapsack model is configured to solve a problem of the peer-to-peer transactions, which is used in conjunction with the decentralized blockchain technically similar features, the solving algorithm of the multiple knapsack model is written in the Ethereum contract using a "Solidity" to solve the problem.

* * * * *